United States Patent
Kodukula et al.

[11] Patent Number: 6,118,379
[45] Date of Patent: Sep. 12, 2000

[54] RADIO FREQUENCY IDENTIFICATION TRANSPONDER HAVING A SPIRAL ANTENNA

[75] Inventors: Venkata S. R. Kodukula; Dah-Weih Duan, both of Yorktown Heights; Michael John Brady, Brewster, all of N.Y.

[73] Assignee: Intermec IP Corp., Woodland Hills, Calif.

[21] Appl. No.: 09/191,641

[22] Filed: Nov. 13, 1998

Related U.S. Application Data

[63] Continuation-in-part of application No. 09/191,642, Nov. 30, 1998.
[60] Provisional application No. 60/070,117, Dec. 31, 1997.
[51] Int. Cl.[7] .................................................. G08B 13/14
[52] U.S. Cl. ................................. 340/572.8; 340/572.4; 340/572.7; 343/895; 343/872; 343/845; 343/700 MS
[58] Field of Search ............................. 340/572.8, 572.7, 340/572.4, 572.1, 825.54; 343/793, 895, 872, 867, 873, 700 MS, 845, 844

[56] References Cited

U.S. PATENT DOCUMENTS

| | | | |
|---|---|---|---|
| 3,812,494 | 5/1974 | Howell et al. | 343/852 |
| 4,123,754 | 10/1978 | Armstrong | 343/615 SS |
| 5,414,427 | 5/1995 | Gunnarsson | 342/51 |
| 5,777,561 | 7/1998 | Chieu et al. | 340/825.54 |
| 5,942,987 | 8/1999 | Heinrich et al. | 340/825.54 |
| 5,945,938 | 8/1999 | Chia et al. | 342/42 |

FOREIGN PATENT DOCUMENTS 0 595 549  5/1994  European Pat. Off. .

*Primary Examiner*—Daniel J. Wu
*Assistant Examiner*—Toan Pham
*Attorney, Agent, or Firm*—O'Melveny & Myers LLP

[57] ABSTRACT

A radio frequency identification (RFID) transponder (tag) includes a spiral over ground plane antenna. The RFID tag includes a RFID circuitry that may be implemented as an RFID tag integrated circuit and may be mounted on one surface of a substrate such as a printed circuit board. The RFID tag circuitry may be electrically connected to an impedance matching circuit printed on the same side of printed circuit board. The matching circuit is electrically connected to a spiral antenna that may be mounted on same side of the printed circuit board as the tag circuit and matching circuit. The spiral antenna is held a prescribed distance from the ground plane in order to maximize the gain of the RFID tag and to thereby maximize the range of the RFID tag.

23 Claims, 3 Drawing Sheets

RADIO FREQUENCY IDENTIFICATION TRANSPONDER HAVING A SPIRAL ANTENNA

CROSS REFERENCE TO RELATED APPLICATIONS

The present application relates to co-pending U.S. Provisional Patent Application Ser. No. 60/070,117 filed Dec. 31, 1997 and is a continuation-in-part of co-pending U.S. Non-Provisional Patent Application Ser. No. 09/191,642 filed Nov. 30, 1998.

FIELD OF THE INVENTION

The invention relates to radio frequency identification (RFID) systems and, more particularly, to RFID systems that employ a high gain antenna.

BACKGROUND OF THE INVENTION

Radio Frequency Identification (RFID) transponders (tags) are operated in conjunction with RFID base stations for a variety of inventory-control, security and other purposes. Typically an item having a tag associated with it, for example, a container with a tag placed inside it, is brought into a "read zone" established by the base station. The RFID base station generates a continuous wave electromagnetic disturbance at a carrier frequency. This disturbance is modulated to correspond to data that is to be communicated via the disturbance. The modulated disturbance, which carries information and may be sometimes referred to as a signal, communicates this information at a rate, referred to as the data rate, which is lower than the carrier frequency. The transmitted disturbance will be referred to hereinafter as a signal or field. The RFID base station transmits an interrogating RF signal which is modulated by a receiving tag in order to impart information stored within the tag to the signal. The receiving tag then transmits the modulated, answering, RF signal to the base station.

RFID tags may be active, containing their own RF transmitter, or passive, having no transmitter. Passive tags, i.e., tags that rely upon modulated back-scattering to provide a return link to an interrogating base station, may include their own power sources, such as a batteries, or they may be "field-powered", whereby they obtain their operating power by rectifying an interrogating RF signal that is transmitted by a base station. Although both battery-powered and field powered tags have minimum RF field strength read requirements, or read thresholds, in general, a field-powered passive system requires at least an order of magnitude more power in the interrogating signal than a system that employs tags having their own power sources. Because the interrogating signal must provide power to a field-powered passive tag, the read threshold for a field-powered passive tag is typically substantially higher than for an active tag. However, because field-powered passive tags do not include their own power source, they may be substantially less expensive than active tags and because they have no battery to "run down", field-powered passive tags may be more reliable in the long term than active tags. And, finally, because they do not include a battery, field-powered passive tags are typically much more "environmentally-friendly".

Although field-powered passive tag RFID systems provide cost, reliability, and environmental benefits, there are obstacles to the efficient operation of field-powered passive tag RFID systems. In particular, it is often difficult to deliver sufficient power from a base station to a field-powered passive tag via an interrogating signal. The amount of power a base station may impart to a signal is limited by a number of factors, not the least of which is regulation by the Federal Communication Commission (FCC). In addition to limits placed upon the base station's transmitted power, i.e., the power level at the base station's antenna input, RFID tags are often affixed to the surface of or placed within, a container composed of RF absorptive material. The container may move along a conveyor or roller system and, as the container enters the reading zone of a reading station, an interrogating signal is transmitted to the container. Ideally, the tag would be read regardless of the tag's location within the container or the orientation of the container as it passes the reading station. Unfortunately, the electromagnetic field pattern set up by an RF signal will typically include areas of relatively low field strength which preclude the reading of RF tags as they pass by a reading station. In the case of such a reading failure, a human operator may have to intervene by re-orienting the container and passing it by the read station once more. Alternatively, human operators may be required to orient containers in a preferred orientation so that the containers may be reliably read as they pass the reading station. Such human intervention can be a costly, time consuming, and relatively unreliable approach.

Some RFID applications operate on a scale that strongly encourages the use of RFID tags which can be read from a distance. That is, a tag that can be read from a distance of only one meter or less may be perfectly serviceable for some applications, such as an application where an RFID tag is enclosed within a small container of clothes and is transported past a base station to be read. But larger scale industrial and warehousing applications, such as the tracking of pallets and their associated goods, may benefit from an RFID tag that provides a longer reading range. Without a tag having a relatively long reading range, bulky items such as loaded pallets may require that an RFID base station be located so close to the tag which is to be read as to interfere with the movement of the pallet. An RFID tag with a longer reading range would provide more positioning flexibility for the RFID base station, thereby reducing the probability that the base station would interfere with the movement of the bulky item. At the same time, the RFID tag itself should be relatively compact, rugged, and inexpensive. Additionally, the RFID tag would preferably be elliptically polarized, with a low axial ratio, e.g., circularly polarized, to ensure that interrogating signals of a wide variety of polarizations would be accommodated.

There is, therefore, a need for a compact, inexpensive, RFID tag that provides relatively long-range operation.

RELATED APPLICATIONS AND ISSUED PATENTS

Related U.S. Patents assigned to the assignee of the present invention include: 5,528,222; 5,550,547; 5,552,778; 5,554,974; 5,538,803; 5,563,583; 5,565,847; 5,606,323; 5,521,601; 5,635,693; 5,673,037; 5,682,143; 5,680,106; 5,729,201; 5,729,697; 5,736,929; 5,739,754; 5,767,789; 5,831,532; 5,821,859; 5,736,929 and 5,739,754. Patent applications assigned to the assignee of the present invention include: application; No. 08/621,784, filed on Mar. 25, 1996 entitled, "Thin Radio Frequency Transponder with Leadframe Antenna Structure" by Brady et al. (now issued as U.S. Pat. No. 5,786,626, issued Jul. 28, 1998); Application No. 08/626,820, Filed: Apr. 3, 1996, entitled, "Method of Transporting RF Power to Energize Radio Frequency Transponders", by Heinrich et al.; Application No. 08/694,606 filed Aug. 9, 1996 entitled, "RFID System with Write Broadcast Capability" by Heinrich et al.; application No. 08/681,741, filed Jul. 29, 1996 entitled, "RFID Transponder with Electronic Circuit Enabling and Disabling Capability", by Heinrich et al.; Application No. 08/330,288 (See also PCT International Application No. PCT/EP95/03703 filed Sep. 20, 1995, and U.S. Application No. 08/330,288 filed Oct. 27, 1994, now abandoned, on which the PCT application is based); The above identified U.S. Patents and U.S. Patent applications are hereby incorporated by reference. Additionally, Patent Applications entitled, "Radio Frequency Identification Transponder Having a Helical Antenna", "Radio Frequency Identification Transponder Employing a Patch Antenna", and "Distributed Impedance Matching Circuit For High Reflection Coefficient Load", "RFID Transponder Having Improved RF Characteristics", filed on the same day as this application and assigned to the same assignees as this application is assigned are also incorporated by reference.

The applicants claim priority under 35 U.S.C. 119 (e) for provisional application No. 60/070,117 filed on Dec. 31, 1997, attorney docket No. YO895-032P1.

SUMMARY

A radio-frequency identification (RFID) transponder (tag) in accordance with the principles of the invention includes a spiral antenna located "over" a ground plane. The spiral antenna provides wideband, high gain operation and, therefore, a relatively long range of operation for a broad range of frequencies. In an illustrative embodiment the antenna has a low axial ratio, yielding substantially circular polarization. Circular polarization permits the RFID tag to respond to interrogating signals having a wide variety of polarizations.

In an illustrative embodiment, the new RFID tag includes a printed circuit board having an integrated circuit (tag IC) mounted on one surface of the circuit board. The tag IC includes RFID tag electronics and is electrically connected to an impedance matching circuit printed on the same side of printed circuit board. The matching circuit is electrically connected to a spiral antenna that is printed on same side of the printed circuit board as the tag IC and matching circuit. A ground plane is printed on the opposite side of the printed circuit board, excluding the area underneath the spiral antenna. The matching circuit is typically made of microstrip line sections connected in series and/or in parallel, and the ground plane on the opposite side of the printed circuit board is part of the microstrip line structure. Since, in the illustrative embodiment, the antenna, the impedance matching circuit and tag IC are all located on the same side of the printed circuit board, the expense and inconvenience of using a "via" to feed the antenna conductor from one side of the printed circuit board to the other is avoided. The spiral antenna is positioned a predetermined distance above another ground plane located on a separate printed circuit board or other flat metallic surface and is held in position at that distance through the use of "spacers" or "standoffs".

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
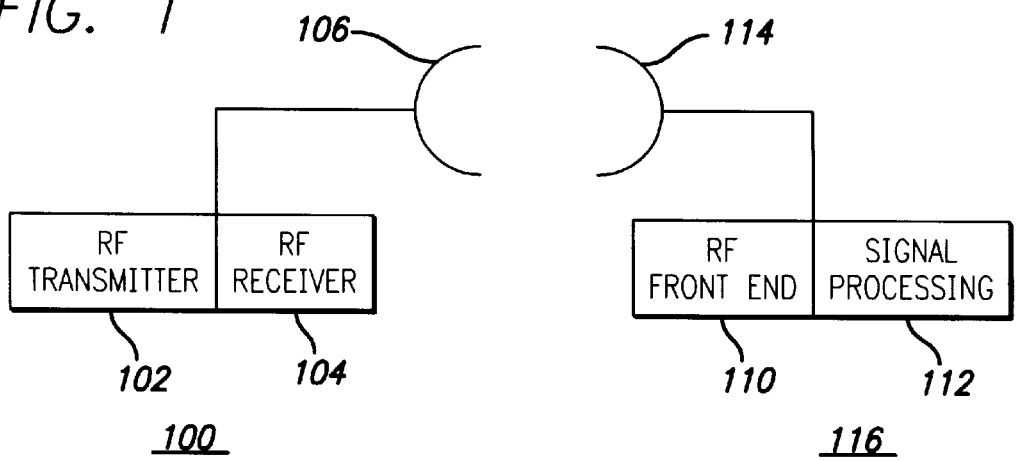
FIG. 1 is a conceptual block diagram of an RFID system in accordance with the principles of the invention.

An RFID system in accordance with the principles of the present invention is illustrated in the conceptual block diagram of FIG. 1. An RF base station 100 includes an RF transmitter 102, an RF receiver 104, and an antenna 106 connected to the transmitter 102 and receiver 104. An RF tag 116 such as may be used in conjunction with the base station 100 includes an RF front end 110, a signal processing section 112, and a spiral antenna 114 which provides high gain, low axial ratio, high directivity operation over a relatively wide frequency band.

In operation, the base station 100 interrogates the tag 116 by generating an RF signal having a carrier frequency $F_c$. The carrier frequency $F_c$ is chosen based on a number of factors known in the art, including the amount of power permitted at that frequency by FCC regulations. The RF signal is coupled to the antenna 106 and transmitted to the tag 116. As will be discussed in greater detail below, the tag may be employed in a number of applications, but is particularly suited to industrial or warehousing applications in which the tag may be mounted within a plastic container that is, in turn, mounted on or within a pallet. The container associated with the tag 116 is typically moved into a "read zone" within which it is intended that the RF tag will be successfully interrogated.

The RF signal emitted by the antenna 106, will, ostensibly, be received by the tag antenna 114 and, if the RF signal's field strength meets a read threshold requirement, the RF tag will respond to the reception of the signal by modulating the RF carrier to impart information about the associated container onto the back-scattered RF field, which propagates to the base station 100. The RF signal transmitted by the base station 100 must have sufficient field strength, taking into account the polarization of the signal and of the tag's antenna, at the location of the tag 116 for the tag to detect the RF signal. In the case of a field-powered passive tag, the interrogating signal's field strength generally must be great enough for the tag 116 to rectify the signal and to use the signal's energy for the tag's power source.

Turning now to FIG. 2, an illustrative embodiment of an RF tag in accordance with the principles of the present invention is shown in a perspective view. The RF ID tag 116 includes a spiral antenna 118 which may be formed of a layer of conductive material such as copper deposited in a spiral pattern on a printed circuit board 120 using conventional printed circuit techniques. The spiral antenna 118 could also be formed of a wire shaped into a spiral pattern and affixed to the printed circuit board 120. As is known in the art, the printed circuit board 120 may be composed of an epoxy resin, epoxy glass, or other material that may be rigid or flexible. These materials may be of a variety of thicknesses and may exhibit any of a variety of relative permittivities. The illustrative embodiment employs a 30 mil thick sheet of material known as "fire resistant four" or FR-4, which has a relative permittivity of approximately 4.5, as the board material.

Figure 2A:
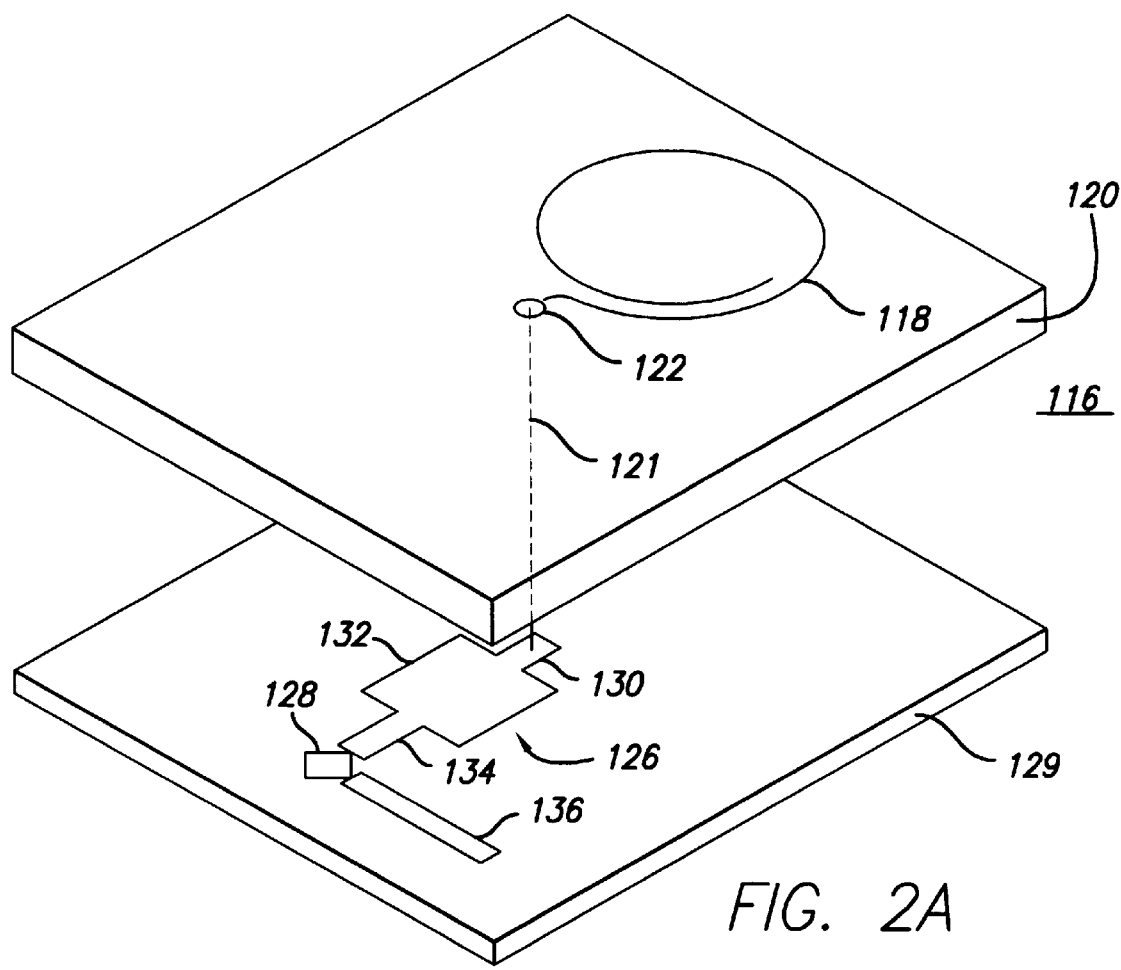
FIGS. 2A, 2B, 2C, 2D and 2E are perspective, and landscape views of an illustrative embodiment of an RFID tag in accordance with the principles of the invention.
Figure 2B:
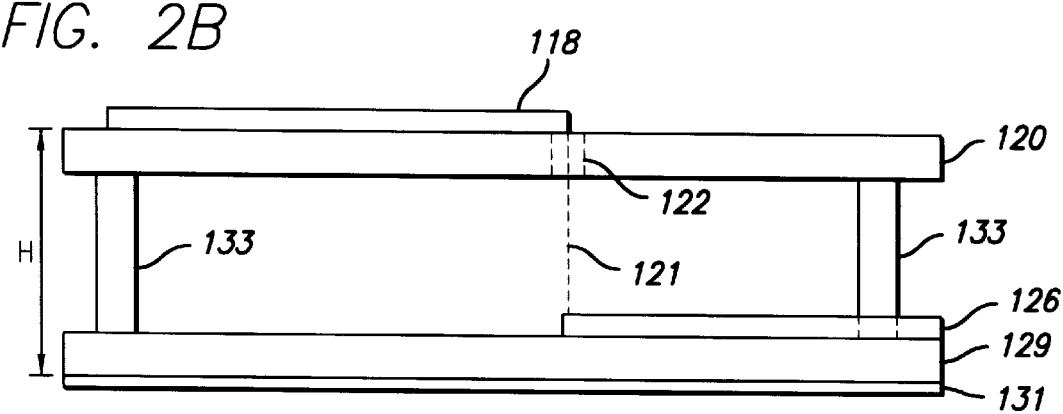
Figure 2C:
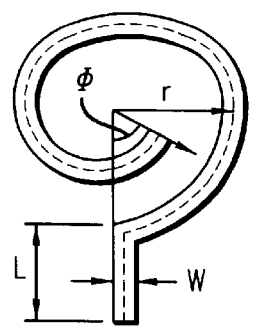
Figure 2D:
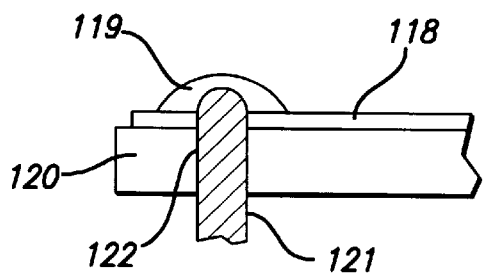

Features of the antenna 118 are set forth in greater detail in the top plan view of FIG. 2C. The spiral antenna 118, also referred to as a partial spiral antenna, may be defined by the equation for an Archimedian spiral, as follows:

$$r = (a)(\phi)$$

Where:

r=the radial distance from the center of the spiral a=a "growth rate" constant

φ=the angle of the spiral

The above parameters are illustrated in the top plan view of FIG. 2C. The angle φ is the difference between the starting and ending angles of the spiral, defined respectively, as the angle the starting point and end point make with respect to a ray within a common coordinate system. For example, the starting angle of the spiral of FIG. 2C may be defined in a coordinate system with the ray labeled r at 0 degrees and the lines defining the starting and ending angles defined by the rays which define the angle φ. The antenna 118 may also comprise a plurality of spirals twined together.

Although a conventional spiral antenna is generally characterized by a very wide bandwidth and relatively low gain, the illustrative spiral antenna 118 trades off bandwidth for gain. That is, the gain of the partial spiral antenna 118 is greater than would be obtained from a similar full-spiral antenna, but the bandwidth is narrower. Since, in an RFID tag application, the frequency range of interest is generally known, the spiral antenna 118 may be designed for operation in a relatively narrow band around the RFID system's assigned frequency of operation. The RFID tag could then take advantage of the relatively high gain of the spiral antenna 118, without suffering from the consequences of a relatively narrow bandwidth.

In this illustrative embodiment, the antenna 118 is connected by a wire 121 through a via 122 in the printed circuit board 120 to an impedance matching circuit 126 and, from there, to a tag integrated circuit (IC) 128. The wire 121, via 122, and printed circuit board are illustrated in greater detail in the sectional view of FIG. 2D. Solder 119 makes the electrical connection between the wire 121 and antenna 118. The impedance matching circuit 126 and tag IC 128 are all printed and mounted on the first side of a printed circuit board 129 which may also be composed of a material such as FR-4. A ground plane is formed on the other side of the printed circuit board. The tag IC incorporates the RF front end 110 and signal processing 112 functions discussed in relation to FIG. 1. The tag IC 128 may be implemented with any of a variety of package styles but is, in the illustrative embodiment, packaged in a mini small outline package (MSOP) and is mounted directly to the circuit board 129 and connected in a conventional manner to the impedance matching circuit 126. Such "surface mounting" of IC packages is known, and is discussed, for example in U.S. Pat. No. 5,528,222 entitled "Radio Frequency Circuit and Memory in Thin Flexible Package", issued Jun. 18, 1996 to Moskowitz et al, which is hereby incorporated by reference. Impedance matching circuits are known and described, for example, in "The Art Of Electronics", Second Edition, Paul Horowitz and Winfield Hill, Cambridge University Press, 1989, pp. 879–883, which is hereby incorporated by reference. The via 122 may be eliminated by forming the spiral antenna 118 on a side of the printed circuit board 120 which faces the matching circuit and solder-connecting the wire 121, which may be spring loaded to insure good contact with the antenna 118.

In an illustrative embodiment, the matching circuit includes a 50 ohm microstrip line 130 which broadens into a 5 ohm line 132, then returns to a 50 ohm line 134. A more detailed description of the matching circuit is set forth in a copending application, filed on the same day as this application by the same inventors, entitled, "Distributed Impedance Matching For High Reflection Coefficient Load", which is hereby incorporated by reference. In the illustrative embodiment of FIG. 2A, the microstrip lines are printed copper with a "ground plane" deposited on the opposite side of the board. The tag IC 128 is soldered at one antenna input to the 50 ohm line 134. The other antenna input of the tag IC is soldered to a 50 ohm microstrip line quarter wave transformer 136. The length of the quarter wave transformer 136 is chosen to be one quarter the guided wavelength in the microstrip line at the base station interrogating signal's carrier frequency, which is 2.45 GHz in the illustrative embodiment. Quarter wave transformers are known and are discussed, for example, in a U.S. Provisional Patent Application Ser. No. 60/077,879, filed Mar. 13, 1998, entitled "RF TAG HAVING QUARTER WAVE TRANSFORMER", with inventors Feild, Duan, Brady, Moskowitz, and Kodukala. This provisional application is hereby incorporated by reference in its entirety. Other, conventional, matching circuits, such as lumped circuits that employ elements such as inductors and capacitors, may also be used to match the impedances of the antenna 118 and RFID tag circuitry, such as the tag IC 128. Furthermore, a matching circuit may be integrated within the tag IC itself. As is known in the art, a microstrip line includes three components: a conductive line on one surface of a substrate, a dielectric substrate, and a ground plane on the opposite side of the substrate. Typically, the fabrication of microstrip lines begins with a printed circuit board having copper on both surfaces. The copper on one side is then etched to pattern the line, and the copper on the "opposite" side of the board is left intact to form a ground plane. The elevation view of FIG. 2B is of an illustrative embodiment of the spiral antenna RFID tag in which, as in FIG. 2A, the impedance matching circuit 126 and tag IC 128 are mounted on one surface of the printed circuit board 129. This surface, for the ease and clarity of description, will be referred to herein as the "top" surface. Although the tag IC 128 would generally protrude from the top surface of the printed circuit board 129 farther than the matching circuit, this is not illustrated in FIG. 2B. The spiral antenna 118 is electrically connected to the matching circuit 126 through the wire 121 which extends through the via 122 and descends from there to make an electrical connection with the impedance matching circuit 126, through surface-mounting, a solder joint, or other conventional means. A ground plane 131 is formed on the opposite side of (under) the printed circuit board 129 using conventional printed circuit deposition or lamination techniques.

There is a complex relationship between the gain of the antenna and the distance H between the spiral antenna 118 and the ground plane 131. The relationship also involves the dielectric constant (relative permittivity) of the material between the antenna 118 and the ground plane 131, the thickness of each intervening layer of material, the overall length and width of the spiral, (in fact, by all the geometrical factors of the spiral 118, including the width of the spiral trace on the printed circuit board, the starting angle and ending angle of the spiral), the thickness of the connecting wire 121, the desired frequency of operation, and other factors. These factors may be taken into account in the course of designing a specific implementation of an RFID tag having a spiral over ground plane antenna in accordance with the principles of the invention. An electromagnetic simulation package, such as IE3D from Zeland Software or HFSS available from Hewlett Packard Corporation, Palo Alto, Calif. may be employed to aid in the design of such an implementation. The proper distance H may be maintained through use of "standoffs" 133 which may be attached to the boards 120 and 131 in any of a variety of manners, including through the use of screws, adhesives, etc. The "standoffs"

themselves may be simple nylon bushings, for example. Note that none of the drawings are to scale and that, for example, the wire 121 may be considerably thicker than the copper pattern that forms the spiral antenna 118.

As a result of experimentation and simulation, a number of effects relating the geometrical parameters and the antenna characteristics have been identified. For example, the input impedance of the antenna 118 is a strong function of the line width of the spiral; the narrower the spiral line, the higher the antenna input impedance. The bandwidth of the antenna is determined, in a nonlinear manner, by the starting and ending angles of the spiral and the standoff height H. In general, the spiral's bandwidth is increased with increasing standoff height and with increasing difference between the spiral's starting and ending angles. An approximately one-turn, one-wavelength spiral is capable of providing 8 to 9 dB of gain. The gain of the antenna is also affected by the size of the ground plane, with a larger ground plane increasing the gain in one direction while decreasing the gain in another.

In general, the antenna configuration is linearly polarized, but circular polarization can be achieved when the spiral antenna makes slightly more than one turn, the spiral's length is approximately 20% longer than the wavelength of operation and the spiral is approximately one quarter wavelength removed from the ground plane. Additionally, for circular polarization, the length L of the straight tail of FIG. 2C must, when combined with the length of the spiral support a current distribution that has substantially linear phase and uniform amplitude. Illustrative examples of circularly polarized spiral antennas having axial ratios less than half a decibel and gains greater than 8 dB are set forth in Table 1, which follows.

TABLE 1

|   | Case 1 | Case 2 | Case 3 |   |
|---|--------|--------|--------|---|
| H | 31.46  | 31.97  | 32.70  | (mm) |
| a | 0.422  | 0.427  | 0.428  | (mm/radian) |
| θ (start) | 42.72 | 42.74 | 42.83 | (radians) |
| θ (end)   | 50.27 | 50.27 | 40.27 | (radians) |
| L | 0 | 9.4 | 16.6 | (mm) |

Figure 2E:
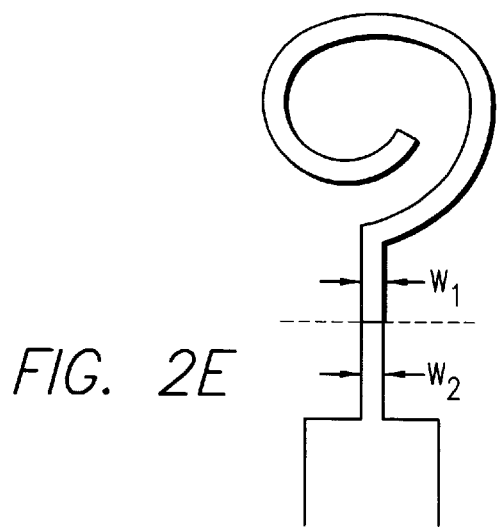

An application that is suited to operation with a linearly polarized antenna provides a great deal more flexibility in choosing geometric parameter values. For example, the stand off height H can be as little as one tenth of the wavelength of operation. Referring to FIG. 2E, the width W1 of the "tail" from the antenna spiral 118 should match the width W2 of the connecting section of the impedance matching network in order to avoid reflections. One or both of the members could be tapered to insure that the widths match at the joint.

Figure 3A:
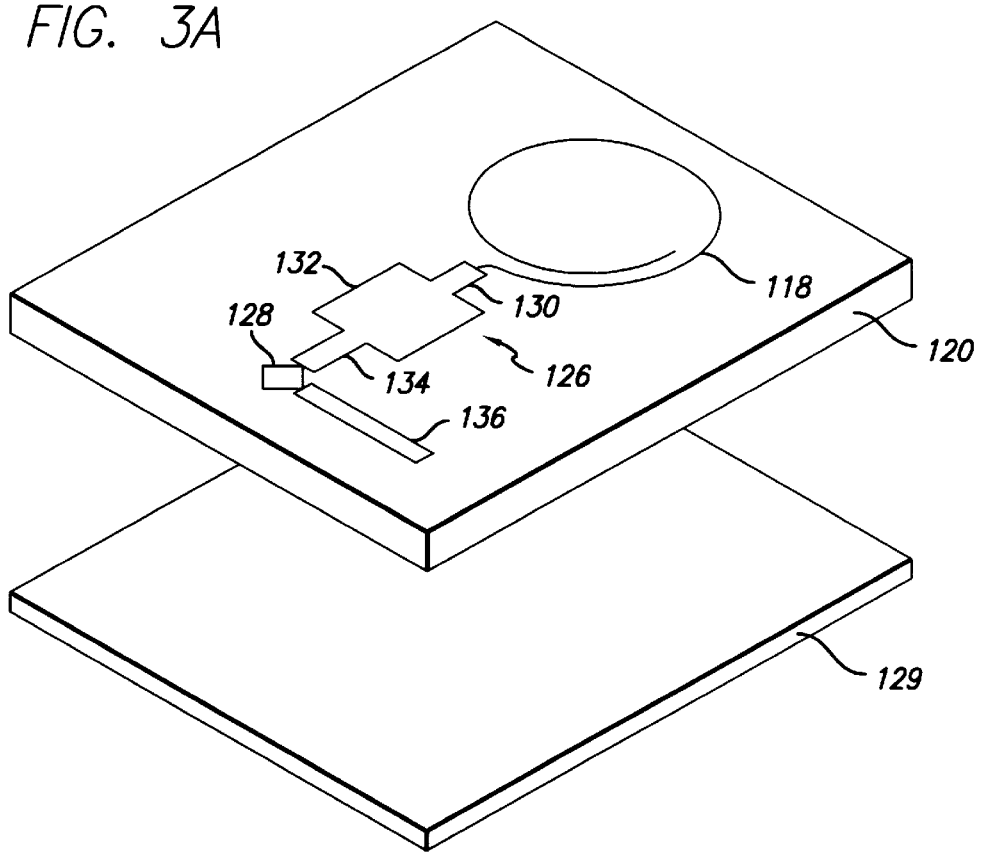
FIGS. 3A and 3B are perspective and landscape views, respectively, of a "via-free" embodiment of an RFID tag in accordance with the principles of the invention.

The perspective view of FIG. 3A is of another illustrative embodiment of an RFID tag in accordance with the principles of the present invention. In this illustrative embodiment, a spiral antenna 118 is co-located on the same surface of a printed circuit board 120 as a matching circuit 126 and tag IC. The matching circuit 126 includes lines 130, 132, and 134 and a quarter wave transformer 136. The matching circuit 126 and tag IC are as described in the discussion related to FIG. 2A. A second ground plane, on printed circuit board 129, is located a distance H "below" the spiral antenna 118. The ground plane need not be mounted on a printed circuit board. A sheet of Aluminum, or other conductor held at the appropriate distance "H" could also be used. As noted in the discussion related to FIG. 2B, the ground plane is preferably held at a distance "H" from the spiral antenna 118 through the use of "standoffs" (not shown). In this illustrative embodiment no vias are required to electrically connect the impedance matching circuit 126 to the spiral antenna. Eliminating vias reduces manufacturing costs and, since no wire need be extended from one board to another, the reliability of the RFID tag may be significantly increased. Not only does this "via-free" design reduce manufacturing costs and increase reliability when compared to the embodiment of FIGS. 2A and 2B, the performance of the via-free RFID tag may be enhanced due to the elimination of impedance mismatches caused by abrupt turns in the wire 121 that are required to feed the wire into the via 130 and to connect the wire 121 to the impedance matching circuit 126.

Figure 3B:
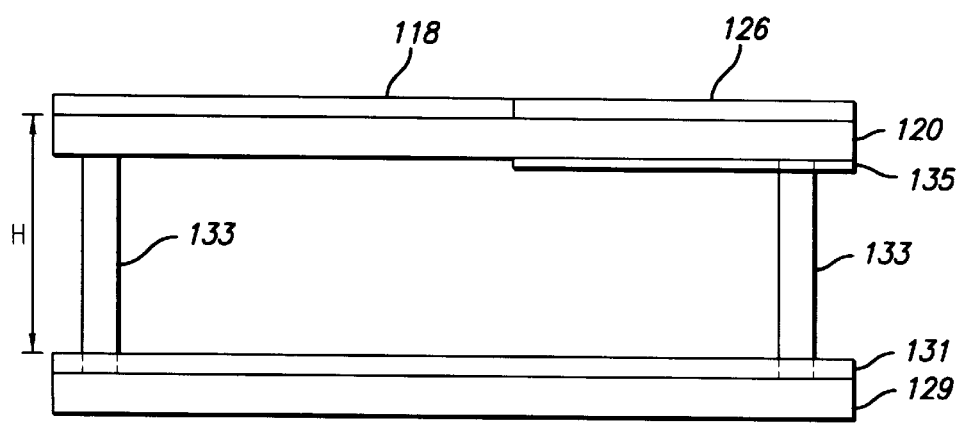

The landscape view of FIG. 3B illustrates the embodiment of FIG. 3A when viewed from one side. As noted in the discussion related to FIG. 3A, the spiral antenna 118, the impedance matching circuit 126, and the tag IC (not seen from this perspective) are colocated on the "top" surface of the printed circuit board 120. A ground plane 135 is formed on the bottom surface of the printed circuit board 120 beneath the matching circuit 126 and tag IC 128 but not underneath the spiral antenna 118. A separate ground plane 131 is formed on a second printed circuit board 129 and held a distance H from the spiral antenna by standoffs 133. The board 120 may also be "flipped over", so that the spiral antenna 118, the matching circuit 126, and the tag IC are all on the "bottom side", while the partial ground plane 135 is on the "top side", above the matching circuit. The board 129 and ground plane may be replaced by a conductor, such as a sturdy sheet of Aluminum, which may be less expensive and sturdier than the printed circuit board.

In the illustrative embodiments, the RFID tag may be packaged, for example in a relatively low profile plastic container composed of a material such as Polypropylene, Polyethylene, Polyester, etc. Due to its low profile, the RFID tag may be unobtrusively placed on or in the loading pallets or other containers that the RFID tag is meant to monitor.

The foregoing description of specific embodiments of the invention has been presented for the purposes of illustration and description. It is not intended to be exhaustive or to limit the invention to the precise forms disclosed, and many modifications and variations are possible in light of the above teachings. Although the antenna spiral may be formed as a printed circuit trace as illustrated, it could also be made of a wire that is formed into the desired spiral shape and adhered to a printed circuit board. The board upon which the wire is mounted could be fixed in some manner the appropriate distance from an associated ground plane. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A radio-frequency identification transponder (RFID tag) comprising:
   a spiral antenna;
   RF tag circuitry having at least one antenna input, the tag circuitry disposed on a substrate and electrically coupled to the spiral antenna, and
   a ground plane spaced from the spiral antenna by a predetermined distance, said spiral antenna thereby providing substantially circular polarization.

2. The RFID tag of claim 1 wherein the substrate comprises a printed circuit board.

3. The RFID tag of claim 1 wherein the tag circuitry comprises an integrated circuit.

4. The RFID tag of claim 1 wherein the spiral antenna comprises a predetermined spiral pattern of conductive material disposed on the substrate.

5. The RFID tag of claim 1 wherein the spiral antenna comprises a wire that is affixed to the substrate in a predetermined spiral pattern.

6. The RFID tag of claim 1 further comprising an impedance-matching circuit connected between the spiral antenna and the at least one antenna input of the RFID tag circuitry.

7. The RFID tag of claim 6 further comprising a quarter-wave transformer, wherein the at least one antenna input further comprises first and second antenna inputs, the first antenna input being coupled to the spiral antenna and the second antenna input being connected to the quarter-wave transformer.

8. The RFID tag of claim 7 wherein the spiral antenna, the impedance matching circuit, the RFID tag circuitry, and the quarter-wave transformer are all disposed on the same surface of the substrate.

9. The RFID tag of claim 8 wherein the ground plane is disposed on an opposite side of the substrate from that to which the impedance matching circuit, the RFID tag circuitry, and the quarter-wave transformer are disposed, the ground plane thereby underlying these elements of the RFID tag.

10. The RFID tag of claim 1 wherein the ground plane is disposed parallel to a plane defined by the spiral antenna.

11. The RFID tag of claim 1 wherein the spiral antenna further comprises a spiral pattern including slightly more than one turn, a length of the spiral antenna thereby being approximately 20% longer than a corresponding wavelength of operation of the RFID tag.

12. The RFID tag of claim 11 wherein the spiral antenna is spaced from the ground plane by approximately one quarter wavelength of operation of the RFID tag.

13. An RFID system including:
an RFID base station; and
an RFID tag that includes a spiral antenna, RFID tag circuitry having at least one antenna input, the tag circuitry disposed on a substrate and electrically coupled to the spiral antenna, and a ground plane spaced from the spiral antenna by a predetermined distance, the spiral antenna thereby providing substantially circular polarization.

14. The RFID system of claim 13 wherein the spiral antenna comprises a predetermined spiral pattern of conductive material disposed on the substrate.

15. The RFID system of claim 13 wherein the spiral antenna comprises a wire that is affixed to the substrate in a predetermined spiral pattern.

16. The RFID system of claim 15 further comprising a quarter-wave transformer, wherein the at least one antenna input further comprises first and second antenna inputs, the first antenna input being coupled to the spiral antenna and the second antenna input being coupled to the quarter-wave transformer.

17. The RFID system of claim 16 wherein the spiral antenna, the impedance matching network, the tag circuitry and the quarter-wave transformer are all disposed on the same surface of the substrate.

18. The RFID tag of claim 16 wherein the ground plane is disposed on the opposite side of the substrate from that on which the impedance matching circuit, the tag IC, and the quarter-wave transformer are disposed, the ground plane thereby underlying these elements of the RFID tag.

19. The RFID system of claim 13 further comprising an impedance-matching circuit connected between the spiral antenna and the at least one antenna input of the RFID tag circuitry.

20. The RFID system of claim 13 wherein the ground plane is provided parallel to a plane defined by the spiral antenna and is disposed on a second substrate spaced a predetermined distance from the spiral antenna.

21. A method of reading an RFID tag comprising the steps of:

(a) transmitting a querying signal from an RFID base station;

(b) receiving the querying signal by an RFID tag that includes a spiral antenna disposed over a ground plane, the spiral antenna providing substantially circular polarization;

(c) modulating the received querying signal by the RFID tag; and (d) sending the modulated signal from the RFID tag to the base station.

22. The method of claim 21 wherein step (d) further comprises backscattering of RF energy from the RFID tag.

23. The method of claim 21 wherein the RFID tag further comprises an active RFID tag, and wherein step (d) further comprises transmitting RF energy by the active RFID tag.

* * * * *